United States Patent
Zhu et al.

(10) Patent No.: US 12,420,534 B2
(45) Date of Patent: Sep. 23, 2025

(54) AEROGEL POLYSILOXANE LAYER LAMINATE STRUCTURE

(71) Applicant: Dow Silicones Corporation, Midland, MI (US)

(72) Inventors: Bizhong Zhu, Midland, MI (US); Chi-Hao Chang, Midland, MI (US); Kaila Mattson, Midland, MI (US); Craig Gross, Midland, MI (US); Joseph Sootsman, Auburn, MI (US); Greg Becker, Auburn, MI (US)

(73) Assignee: Dow Silicones Corporation, Midland, MI (US)

( * ) Notice: Subject to any disclaimer, the term of this patent is extended or adjusted under 35 U.S.C. 154(b) by 168 days.

(21) Appl. No.: 18/261,291

(22) PCT Filed: Feb. 22, 2022

(86) PCT No.: PCT/US2022/017195
§ 371 (c)(1),
(2) Date: Jul. 13, 2023

(87) PCT Pub. No.: WO2022/197405
PCT Pub. Date: Sep. 22, 2022

(65) Prior Publication Data
US 2024/0066843 A1 Feb. 29, 2024

Related U.S. Application Data

(60) Provisional application No. 63/162,044, filed on Mar. 17, 2021.

(51) Int. Cl.
| | |
|---|---|
| *B32B 27/06* | (2006.01) |
| *B32B 5/18* | (2006.01) |
| *B32B 27/18* | (2006.01) |
| *B32B 27/28* | (2006.01) |
| *H01M 10/658* | (2014.01) |

(52) U.S. Cl.
CPC ............ *B32B 27/065* (2013.01); *B32B 5/18* (2013.01); *B32B 27/18* (2013.01); *B32B 27/283* (2013.01); *H01M 10/658* (2015.04); *B32B 2250/40* (2013.01); *B32B 2264/102* (2013.01); *B32B 2266/126* (2016.11); *B32B 2307/304* (2013.01); *B32B 2307/3065* (2013.01); *B32B 2307/7376* (2023.05); *B32B 2457/10* (2013.01)

(58) Field of Classification Search
CPC ......... B32B 27/065; B32B 5/18; B32B 27/18; B32B 27/283
USPC ....................................................... 428/220
See application file for complete search history.

(56) References Cited

U.S. PATENT DOCUMENTS

| | | | |
|---|---|---|---|
| 6,348,437 B1 | 2/2002 | Avery et al. | |
| 6,596,821 B1 | 7/2003 | Katsoulis et al. | |
| 9,488,311 B2 | 11/2016 | Weidinger et al. | |
| 2006/0264133 A1* | 11/2006 | Krajewski | C09D 183/04 442/99 |
| 2019/0030873 A1 | 1/2019 | Takayasu et al. | |
| 2019/0089027 A1 | 3/2019 | Sultenfuss et al. | |

FOREIGN PATENT DOCUMENTS

| | | | | |
|---|---|---|---|---|
| CA | 2036634 A1 * | 9/1991 | ............... | B32B 7/12 |
| CN | 108587510 | 9/2018 | | |
| CN | 111682286 | 9/2020 | | |
| CN | 111730926 | 10/2020 | | |
| CN | 111730926 A * | 10/2020 | ........... | B32B 25/045 |
| EP | 2277691 | 1/2011 | | |
| JP | 2010167685 | 8/2010 | | |
| JP | 2018130932 | 8/2018 | | |
| KR | 2017002042 | 1/2017 | | |
| WO | 2017132569 | 8/2017 | | |
| WO | 2020131985 | 6/2020 | | |
| WO | 2021061083 | 4/2021 | | |
| WO | 2021163826 | 8/2021 | | |
| WO | 2021163827 | 8/2021 | | |

OTHER PUBLICATIONS

Machine_English_translation_CN_111730926_A; Dong et. al.; Heat-Insulating flame retardant plate and preparation method thereof; Oct. 2, 2020; JPO; whole document (Year: 2025).*

* cited by examiner

*Primary Examiner* — Tahseen Khan
(74) *Attorney, Agent, or Firm* — Steven W. Mork

(57) ABSTRACT

An article includes a laminate material with an aerogel layer and a polysiloxane layer distinct from the aerogel layer and in contact with the aerogel layer either directly or through an adhesive that is in direct contact with both the aerogel layer and the polysiloxane layer; where the polysiloxane layer comprises a polysiloxane and greater than 5 weight-percent and 95 weight-percent or less based on polysiloxane layer weight of fire retarding additives selected from a group consisting of metal hydroxides, mixed metal hydroxides, hydrated metal salts, and any combinations thereof dispersed throughout the polysiloxane layer.

10 Claims, No Drawings

AEROGEL POLYSILOXANE LAYER LAMINATE STRUCTURE

FIELD OF THE INVENTION

The present invention relates to a laminate article comprising an aerogel layer and a polysiloxane layer.

INTRODUCTION

Electric vehicle (EV) technology is becoming increasing popular. EV technology utilizes a battery pack to store energy and power a vehicle. Energy demands of a vehicle are high, particularly with increasing desires and demands for EVs that can travel greater distances between charging the battery pack. Uncontrolled release of the energy of a charged battery pack for an EV can be catastrophic due to tremendous heat release. Therefore, it is desirable to design battery packs with protections against uncontrolled release of energy from the battery pack.

Battery packs for EVs typically comprise multiple battery cells that are electrically linked together and assembled to form a battery pack directly, or to form a module and then multiple modules are stacked to form a battery pack. An EV can contain up to thousands of battery cells. Battery cells are typically grouped into modules and modules are grouped together to form the battery pack. Failure in a single cell can release enough energy to heat up neighboring cells, resulting in failure of those neighboring cells and release of more energy, which causes more neighboring cells to fail, and so on resulting in uncontrolled release of the energy in the battery pack. Therefore, it is desirable to identify barrier materials that can reside between cells and modules of a battery pack, barrier materials that can insulate neighboring cells from the thermal energy release if a cell fails. Ideal materials would be fire resistant when exposed to temperature in excess of 650 degrees Celsius (° C.), lightweight so as to not add excessive weight to a battery pack and as thin as possible (on the order of millimeters in thickness) so as to keep the total volume of a battery pack to a minimum.

Aerogels are one of the best thermally insulating materials known, are flame resistant, lightweight and can be thin. However, aerogel materials are also very fragile and can fracture, even crumble easily. Therefore, aerogel materials alone are not ideal as barrier materials between cells and modules of an EV battery pack. Laminated aerogel-based materials are also known. Laminated materials comprising aerogel can enhance the integrity of an aerogel. However, the demands of a barrier material for EV battery pack applications limit what additional laminate layers are suitable in such a laminate. The additional laminate layers must still achieve the fire resistance requirement of a barrier material, be lightweight and thin. It is also valuable for the additional laminate layer to compromise the thermal insulating properties of the aerogel as little as possible. It is desirable to identify materials that can serve such a purpose in forming a laminate with aerogel to form a thermally insulating material that is suitable for use in EV battery packs.

BRIEF SUMMARY OF THE INVENTION

The present invention provides a laminate article comprising aerogel and polysiloxane containing particular fire retarding additives. Surprisingly, the laminate of these particular materials results in a laminated structure having greater thermal insulating properties than expected by adding the thermal insulating properties of the individual layers—illustrating synergistic thermal insulating properties as a result of laminating the polysiloxane with the aerogel. As a result, the laminate article demonstrates unexpectedly high thermal insulating capability. In fact, the laminate article can achieve a "Time to 120° C." result of greater than 70 seconds and a "Time to 120° C. per millimeter thickness" result of greater than 15 seconds, even greater than 25 seconds, even greater than 40 seconds in the Thermal Insulation Property test described herein. At the same time, the polysiloxane and aerogel are both flame resistant as demonstrated by lack of flames when compressed directly against a hot plate at a temperature of at least 650° C. in the Flame Resistance test method described herein. The laminate can achieve these properties with a thickness of 10 millimeters or less. Therefore, the laminate achieves desired properties to serve as barrier materials for use in EV battery packs.

In a first aspect, the present invention is an article comprising a laminate material comprising an aerogel layer and a polysiloxane layer distinct from the aerogel layer and in contact with the aerogel layer either directly or through an adhesive that is in direct contact with both the aerogel layer and the polysiloxane layer; where the polysiloxane layer comprises a polysiloxane and greater than 5 weight-percent and 95 weight-percent or less based on polysiloxane layer weight of fire retarding additives selected from a group consisting of metal hydroxides, mixed metal hydroxides, hydrated metal salts, and any combinations thereof dispersed throughout the polysiloxane layer.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods; END refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated.

The article of the present invention is a laminate material comprising an aerogel layer and a polysiloxane layer distinct from the aerogel layer where the aerogel layer and polysiloxane layer are in contact with one another.

"Laminate" means that the article comprises the aerogel layer and polysiloxane layer layered one over the other. The laminate material can comprise multiple aerogel layers and/or multiple polysiloxane layers provided at least one aerogel layer and one polysiloxane layer are distinct from one another and in contact with one another (directly or indirectly through an adhesive layer). For example, the article of the present invention can comprise or consist of one aerogel layer and one polysiloxane layer in contact with one another. The article of the present invention can comprise two polysiloxane layers that each contact a single aerogel layer but not each other such that the aerogel layer is between the two polysiloxane layers and the polysiloxane layers contact opposing surfaces of the aerogel layer. The article can comprise any number of alternating layers of polysiloxane layer and aerogel layer.

The polysiloxane layer can cover the entire outer surface of the aerogel layer, that is, the polysiloxane layer can enclose the aerogel layer. Desirably the polysiloxane layer covers less than the entire outer surface of an adjoining aerogel layer. The layers of a laminate typically contact a primary surface of an adjoining layer. For instance, the polysiloxane desirably contacts, even covers, a primary surface of an aerogel layer regardless of whether it covers the entire outer surface of the aerogel layer or not. A primary surface is a surface having the greatest surface area as projected perpendicularly to the surface onto a plane (to preclude consideration of contours, spaces or voids in a surface).

"Distinct" with respect to layers of a laminate means the two layers are identifiable distinct from one another rather than being completely blended with one another. For instance, distinct with respect to an aerogel layer and polysiloxane layer means that the two layers are identifiable as separate layers as opposed to being completely blended together or entirely dispersed one with the other. The laminate of the present invention has polysiloxane layer in contact with an aerogel layer and distinct from the aerogel layer. That means the polysiloxane layer is not entirely blended into the aerogel layer and the aerogel layer is not entirely blended into the polysiloxane layer. The polysiloxane layer may penetrate to some extent into the surface of the aerogel layer and/or vice versa however the two layers still remain identifiable one from the other as separate layers.

"In contact with one another" with respect to the aerogel layer and polysiloxane layer refers to either direct contact with one another or indirect contact through an adhesive layer that is in direct contact with both the aerogel layer and polysiloxane layer. Typically, the adhesive layer is thinner than both the aerogel layer and polysiloxane layer with which it is in direct contact.

The polysiloxane layer comprises a polysiloxane that is desirably a polysiloxane elastomer (rubber) or gum. Polysiloxane elastomers and gums are well known and can be made by any known process. Desirably, the polysiloxane elastomer comprises 50 mole-percent (mol %) or more, 60 mol % or more, 70 mol % or more, 80 mol % or more, 90 mol % or more and can contain 95 mol % or more polysiloxane units selected from $RSiO_{3/2}$ and $R_2SiO_{2/2}$ units based on total siloxane units. Polysiloxanes units are $R_3SiO_{1/2}$ ("M"-type units), $R_2SiO_{2/2}$ ("D"-type units), $RSiO_{3/2}$ ("T"-type units) and $SiO_{4/2}$ ("Q"-type units), where each R is independently selected from hydrocarbyl and substituted hydrocarbyl groups and the oxygen atoms listed in the units refer to oxygens bonded to silicon atoms of two different siloxane units with the subscript on the oxygen referring to the number of shared oxygens in the numerator and designates the oxygen atom is shared with another siloxane unit by dividing the numerator by 2. Examples of suitable polysiloxane elastomers for use in the polysiloxane layer include, for example, a crosslinked trimethyl terminated dimethyl, dimethyl vinyl-terminated dimethyl, methylvinyl siloxane gum or a hydroxy-terminated polydimethylsiloxane gum, where the gum has a Williams plasticity (per ASTM D926) of 150-155 millimeters/100 millimeters.

The polysiloxane can be an elastomer cured from crosslinkable liquid siloxane compositions by, for example, hydrosilylation and/or condensation reactions. Hydrosilylation curable silicone compositions comprise one or more vinyl containing siloxane polymer and one or more silicon-hydride functional siloxane. At least one of the vinyl containing siloxane polymer and silicon-hydride functional siloxane contain two or more of the specified functionality so as to act as a crosslinker. Hydrosilylation catalysts such as platinum compounds are typically present to facilitate the hydrosilylation reaction. Condensation reaction curable silicone compositions comprise siloxanes bearing condensation curable functionalities such as any one or more selected from hydroxyl and hydrolysable functional groups such as alkoxy, carboxy, amido, enoxy, amino, oximo, and amioxy groups. Condensation reaction curable silicone compositions typically further comprise crosslinkers such as silanes bearing hydrolysable groups, water scavengers such as vinyl trimethoxysilane and methyltrimethoxysilane, and curing catalysts such as titanium and tin compounds can be formulated to tune in curing behavior, shelf life and other properties after cure. The condensation reaction curable silicone composition can be cured at room temperature or at an elevated temperature, with or without artificially added moisture in addition to what is available from the atmosphere as it cures.

Desirably, the polysiloxane layer is a non-porous film layer. That is, the polysiloxane is a continuous film that contacts, or even coats a surface of an aerogel layer.

The polysiloxane layer further comprises fire retarding additives selected from a group consisting of metal hydroxides, mixed metal hydroxides, hydrated metal salts and combinations thereof. Desirably, the fire retarding additives are any one or any combination or more than one additive in a group consisting of aluminum trihydrate and magnesium hydroxide, calcium hydroxide, magnesium carbonate hydroxide, aluminum carbonate hydroxide, boehmite, hydrated magnesium sulfate, magnesium carbonate trihydrate, and magnesium carbonate hydroxide tetrahydrate. Optionally, the polysiloxane layer can further comprise metal carbonates and bicarbonates in combination with metal hydroxides, mixed metal hydroxides and/or hydrated metal salts to further improve flame retardancy. Examples of metal carbonates and bicarbonates include magnesium carbonate, magnesium calcium carbonate (for example, that marketed as huntite) and sodium bicarbonate.

The fire retarding additives are present in the polysiloxane layer at a concentration of 5 weight-percent (wt %) or more, 10 wt % or more, 15 wt % or more, 20 wt % or more, 25 wt % or more, 30 wt % or more, and can be present at a concentration of 35 wt % or more, 40 wt % or more, 45 wt % or more, 50 wt % or more, 55 wt % or more, 60 wt % or more, 65 wt % or more, 70 wt % or more, 75 wt % or more, even 80 wt % or more while at the same time are typically present at a concentration of 95 wt % or less, and can be present at a concentration of 90 wt % or less, 85 wt % or less, 80 wt % or less, 75 wt % or less, 70 wt % or less, 65 wt % or less, 60 wt % or less, 55 wt % or less, even 50 wt % or less, 45 wt % or less, 40 wt % or less, or 35 wt % or less with wt % fire retarding additive relative to weight of polysiloxane layer.

The fire retarding additives are dispersed (that is distributed) in the polysiloxane layer. Desirably, the fire retarding additives are distributed throughout the polysiloxane layer and even more desirably they are homogeneously distributed throughout the polysiloxane layer. For example, the polysiloxane can form a continuous polysiloxane matrix in the polysiloxane layer with the fire retarding additives dispersed in the continuous polysiloxane matrix.

The polysiloxane layer can comprise or be free of any one or any combination of more than one additional additive. "Additional additives" are additives included in addition to the fire retarding additives already mentioned above. For example, the polysiloxane layer can comprise any one or any combination of more than one additional additive selected from a group consisting of silica, calcium silicate, fumed silica, precipitated silica, ground quartz, precipitated and ground calcium carbonate, calcium silicates, calcium sulfate, magnesium sulfate, barium sulfate, zeolites, $TiO_2$, ZnO, magnesium oxide, iron oxides, boron oxide, wollastonite, perlite, vermiculite, mica, Kaolin, glass, glass bubbles, aerogel particles, diatomaceous earth, halloysite, magnetite, hematite; other flame retarding additives such as benzotriazole, ammonium polyphosphate, ammonium or aluminum alkyl phosphinate, melamine polyphosphate, halogen containing fire retardants with or without antimony oxide, dihydrooxaphosphaphenanthrene, zinc stannate, zinc hydroxostannate, platinum metal and platinum metal composition, colorants such as carbon black and pigments (for example, ultramarine blue pigment, and/or yellow 109), stabilizers such as cerium hydroxide; curing catalysts such as peroxides, organostannates or titanates, Pt; curing reaction accelerators or deccelerators such as amines, acetylenic alcohols, organic phosphines; and rheology modifiers such as diluents and thickeners.

The total amount of fire retarding additives and additional additives in the polysiloxane layer is 95 wt % or less, and can be 90 wt % or less, 85 wt % or less, 80 wt % or less, 75 wt % or less, 70 wt % or less, 65 wt % or less, 60 wt % or less, 55 wt % or less, even 50 wt % or less, 45 wt % or less, 40 wt % or less, or 35 wt % or less based on weight of polysiloxane layer provided the amount of fire retarding additives is within the ranges specified for fire retarding additives, above.

The amount of additional additives is only limited by a requirement that the total amount of additive (flame retarding additives plus additional additives) is 95 wt % or less, and can be 90 wt % or less, 85 wt % or less, 80 wt % or less, 75 wt % or less, 70 wt % or less, 65 wt % or less, even 60 wt % or less based on weight of polysiloxane layer. One particularly desirable additional additive is calcium silicate which is desirably included in the polysiloxane layer at a concentration of 6 wt % or more, 7 wt % or more, even 8 wt % or more while at the same time is typically present at a concentration of 70 wt. % or less, 60 wt. % or less, 50 wt. % or less, 40 wt. % or less, 30 wt. % or less, 20 wt. % or less, 15 wt % or less, 10 wt % or less, 9 wt % or less or even 8 wt % or less.

The polysiloxane layer desirably has a thickness of 0.1 millimeter (mm) or thicker, and typically is 0.2 mm or thicker, 0.3 mm or thicker, 0.4 mm or thicker, 0.5 mm or thicker, 0.6 mm or thicker, 0.7 mm or thicker, 0.8 mm or thicker, 0.9 mm or thicker, 1.0 mm or thicker, 1.2 mm or thicker, 1.2 mm or thicker, 1.4 mm or thicker, 1.6 mm or thicker, 1.8 mm or thicker, even 2.0 mm or thicker. There is no technical restriction on the upper limit as to how thick the polysiloxane layer can be. However, typically, in combination with any of the lower limits, the polysiloxane is 10 mm or thinner, 8 mm or thinner, 6 mm or thinner, 4 mm or thinner, 2 mm or thinner, 1.0 mm or thinner and can be 0.8 mm or thinner, 0.7 mm or thinner, 0.6 mm or thinner, even 0.5 mm or thinner.

In the broadest scope of the present invention, the aerogel layer can comprise any aerogel-based material. For example, the aerogel layer comprise or consist of aerogel selected from a group consisting of silica aerogel, metal oxide aerogel, mixed metal oxide aerogel, organic or carbon aerogel, semiconducting metal aerogel, chalcogenide aerogel, metal aerogel, silane and siloxane modified aerogels, and reinforced forms of any of these aerogels. "Aerogel" includes what have been known as "xerogels", which are porous structures that are typically formed by drying a wet gel resulting in more volume shrinkage than 10% for more conventionally known supercritically dried aerogels. Reinforced aerogels include aerogels with fiber reinforcing materials such as glass fiber and/or carbon fiber. Fiber reinforced aerogels can have a fiber mat, mesh or batting within an aerogel material. Such materials are commercially available and can be prepared by disposing an aerogel precursor sol into or around a fiber mat, mesh or batting and then converting the sol to an aerogel with the fiber mat, mesh or batting with the aerogel. Fiber reinforced silica aerogel is particularly desirable for use as an aerogel layer. When the laminate of the present invention comprises more than one aerogel layer, each aerogel layer can be the same or different.

The aerogel layer typically has a thickness of 0.1 millimeter (mm) or more, 0.5 mm or more, preferably one mm or more, 2 mm or more and can be 3 mm or more while at the same time is typically 50 mm or less, 40 mm or less, 30 mm or less, 20 mm or less, 10 mm or less, 5 mm or less, 4 mm or less, and can be 3 mm or less or even 2 mm or less.

The laminate article of the present invention typically has a thickness that is 0.5 mm or greater and can be 0.6 mm or greater, 0.7 mm or greater, 0.8 mm or greater, 0.9 mm or greater, 1.0 mm or greater, 1.25 mm or greater, 1.5 mm or greater, 1.75 mm or greater, 2.0 mm or greater, 2.5 mm or greater, 3.0 mm or greater, 3.5 mm or greater, 4.0 mm or greater, 4.5 mm or greater, 5.0 mm or greater, 5.5 mm or greater, 6.0 mm or greater, 7.0 mm or greater, 8.0 mm or greater, even 9.0 mm or greater while at the same time typically has a thickness that is 50.0 mm or less, 40.0 mm or less, 30.0 mm or less, 20.0 mm or less, 10.0 mm or less, 9.0 mm or less, 8.0 mm or less, 7.0 mm or less, 6.0 mm or less, 5.5 mm or less, 5.0 mm or less, 4.5 mm or less, 4.0 mm or less, 3.5 mm or less, 3.0 mm or less, 2.5 mm or less, 2.0 mm or less, 1.5 mm or less, even 1.0 mm or less. Determine the thickness of the laminate article as a dimension perpendicular to the aerogel and polysiloxane layers.

The aerogel layer and the polysiloxane layer can contact one another directly or through an adhesive layer. While there is no limit to the type of adhesive for the broadest scope of the invention, desirably the adhesive is selected from two part polysiloxane adhesives such as a silicone foam adhesive available under the name DOWSIL™ 3-8235 Foam Part A and B two-part, white, room temperature or heat accelerated silicone foam system. DOWSIL is a trademark of The Dow Chemical Company. When an adhesive is used between an aerogel layer and a polysiloxane layer the adhesive can fully cover or partially cover the surfaces of the aerogel layer and polysiloxane layer that contact each other.

In a broadest sense, there is no limit on how one can make the laminate article of the present invention provided that the aforementioned characteristics of the resulting laminate article are achieved. The Examples section below contains specific exemplary methods for making laminated articles of the present invention both with and without adhesive between the aerogel and polysiloxane layers.

A general procedure for preparing laminates using an adhesive between an aerogel layer and a polysiloxane layer can include the following steps: Providing an aerogel layer and a polysiloxane layer that comprises a cured polysiloxane, disposing an adhesive onto one or both of the aerogel and polysiloxane layer surfaces that intended to contact one another, and then pressing the aerogel and polysiloxane layers together with the surfaces intended to contact one another in contact with one another and the adhesive between the aerogel and polysiloxane layers.

A general procedure for preparing laminates without using an adhesive between an aerogel layer and a polysiloxane layer can include the following steps: Providing an aerogel layer and a polysiloxane layer that comprises a non-cured polysiloxane, positioning the polysiloxane layer with one surface against a surface of the aerogel layer, applying pressure to press the aerogel and polysiloxane layer against one another and heating to trigger curing the polysiloxane of the polysiloxane layer while in contact with the aerogel layer. Desirably, the aerogel and polysiloxane layers are heated and pressed together within a chase (frame) that defines the desired target thickness for the laminated layers so that the resulting laminate has a final thickness equal to the chase frame depth. Heating can be, for example, to temperatures of 150 degrees Celsius (° C.) or higher, 160° C. or higher, 170° C. or higher, even 180° C. or higher. Pressure is typically one ton or more, and can be 2 tons or more, 3 tons or more, 4 tons or more, 5 tons or more, 10 tons or more, 15 tons or more, 20 tons or more, 25 tons or more, 30 tons or more, 35 tons or more, even 40 tons or more while at the same time is typically 50 tons or less, even 40 tons or less, 30 tons or less, 20 tons or less, even 10 tons or less. Apply pressure and heat for typically 10 minutes or more, 15 minutes or more, 20 minutes or more 30 minutes or more 40 minutes or more, even 50 minutes or more while at the same time, typically 60 minutes or less, even 50 minutes or less, 40 minutes or less, 30 minutes or less, 20 minutes or less, even 10 minutes or less.

The polysiloxane layers can be prepared by compounding the fire retarding additives and any additional additives with an uncured polysiloxane elastomer precursor (components of a polysiloxane elastomer prior to curing, that is, crosslinking) to form a compounded material. The compounded material can be calendared to sheets having a desired thickness. When not using an adhesive, the calendared sheets of compounded material can be used as the polysiloxane layer provided in the general procedure described above. When using an adhesive, the calendared sheet can be cured by heating to provide a cured sheet of compounded polysiloxane elastomer to serve as the polysiloxane layer. For curing, heating can be to a temperature of 150 degrees Celsius (° C.) or higher, 160° C. or higher, 170° C. or higher, even 180° C. or higher. Apply heat typically for 10 minutes or more, 15 minutes or more, 20 minutes or more 30 minutes or more 40 minutes or more, even 50 minutes or more while at the same time, typically 60 minutes or less, even 50 minutes or less, 40 minutes or less, 30 minutes or less, 20 minutes or less, even 10 minutes or less. Desirably, the polysiloxane layers are heated under pressure within a chase (frame) that defines the desired target thickness for the polysiloxane layers so that the resulting polysiloxane layer has a final thickness equal to the chase frame depth. Pressure is typically one ton or more, and can be 2 tons or more, 3 tons or more, 4 tons or more, 5 tons or more, 10 tons or more, 15 tons or more, 20 tons or more, 25 tons or more, 30 tons or more, 35 tons or more, even 40 tons or more while at the same time is typically 50 tons or less, even 40 tons or less, 30 tons or less, 20 tons or less, even 10 tons or less.

When the uncured polysiloxane is a curable liquid, the polysiloxane can also be applied as a coating layer onto the primary surface of an aerogel layer, and then cured according to the above stated curing conditions for the curing reaction.

The laminated articles of the present invention are useful as fire resistant barriers and thermal barriers. In particular, the laminated articles of the present invention are useful as barrier materials between battery cells of a battery pack such as those useful in electric vehicles. In such an application, the laminated article is situated between battery cells of a battery pack. For this application, the laminated articles desirably have at least three layers with two polysiloxane layers, one on either side of an aerogel layer, with the polysiloxane layers proximate the battery cells and the aerogel interior between polysiloxane layers. The laminated articles can also be used as thermal insulation anywhere else in and around the battery pack. One such additional use is the insulation between the top of the battery pack and the bottom of the passenger compartment of a vehicle where the battery pack is assembled onto the bottom of the passenger compartment. The laminated articles can also be placed underneath the cover of the battery pack to slow down temperature rise of the cover in the event of a cell failure. More generally the laminated article is useful for any situation where heat flow from a high temperature location needs to be slowed down to an adjacent location.

EXAMPLES

Table 1 lists components for preparing the Samples below.

TABLE 1

| Component | Description | Source |
| --- | --- | --- |
| Aerogel 1 | Chopped glass fiber reinforced silica aerogel blanket, 4 mm thick with a density of 150 kilograms per cubic meter. | Available from Banggood. |
| Aerogel 2 | Chopped glass fiber reinforced silica aerogel blanket, 2 mm thick with a density of 220 kilograms per cubic meter. | Available under the name PYROGEL ™ from McMaster Carr. |
| Silicone Gum ("G1") | Dimethylvinyl-terminated dimethyl, methylvinyl siloxane gum having a Williams plasticity of 155 mm/100 mm and a vinyl content of 0.06 wt %. | Prepare according to teachings in WO2020131985. |
| Silicone Gum ("G2") | Dimethylvinyl-terminated dimethyl, methylvinyl siloxane gum having a Williams plasticity of 154 mm/100 mm and a vinyl content of 0.01 wt %. | Prepare according to teachings in WO2020131985. |
| Silicone Gum ("G3") | Hydroxy-terminated polydimethylsiloxane gum having a Williams plasticity of 150 mm/100 mm and a number average molecular weight of about 250,000**. | Prepare according to teachings in WO2020131985. |
| Silicone Fluid ("F1") | Dimethylvinyl-terminated polydimethylsiloxane having a viscosity of 55,000 centiStokes* at 25° C. | Prepare according to teachings in U.S. Pat. No. 6,348,437B1. |

TABLE 1-continued

| Component | Description | Source |
|---|---|---|
| Silicone Fluid ("F2") | Dimethylvinyl-terminated polydimethylsiloxane having a viscosity of 1,500 centiStokes* at 25° C. and a vinyl content of 5 wt %. | Prepare according to teachings in U.S. Pat. No. 6,348,437B1. |
| Silicone Fluid ("F3") | Dimethylvinyl-terminated polydimethylsiloxane having a viscosity of 450 centiStokes* at 25° C. | Prepare according to teachings in U.S. Pat. No. 6,348,437B1. |
| Silicone Fluid ("F4") | Triethoxyvinylsilane | Sigma-Aldrich |
| Silicone Fluid ("F5") | Vinyltrimethoxysilane | Sigma-Aldrich |
| Silica 1 | Ground quartz having an average particle size (D50) of 5 microns. | Available from U.S. Silica as MIN-U-SIL™ 5 |
| Silica 2 | Fumed silica. | Available as CAB-O-SIL™ MS 75D from Cabot. |
| Black Pigment | C.I. Pigment Black 26 | Available from Ferro Corporation. |
| Blue Pigment | Ultramarine blue pigment | Available from Ferro Corporation. |
| Yellow Pigment | C.I. Pigment Yellow 109 | Available from BOC Sciences. |
| Calcium metasilicate 1 | Wollastonite powder | Available under the name M1250 Wollastocoat™ 10413 from Imerys |
| Calcium metasilicate 2 | Wollastonite powder | Available under the name NYAD 1250 Wollastonite™ from Imerys |
| Cerium hydroxide | Powder | Sigma Aldrich |
| Magnesium Hydroxide | Average particle size of 0.7 micrometers. Triethoxyvinylsilane treated. | Available under the name ZEROGEN™ 100 SP from Huber Engineered Materials |
| Magnesium Oxide | Powder | Available under the name MAGOX™ 98 HR from R. E. Carroll Inc. |
| Magnesium Silicate | Needle-like silicate | Available under the name ADIN™ Clay SIL-1 from Tolsa. |
| Iron Oxide | Powder | Sigma Aldrich |
| Peroxide ("P1") | Bis-(2,4-dichlorobenzoyl) peroxide, 50 wt % concentration in a hydroxy terminated dimethyl methylvinyl siloxane oil. | Available under the name XIAMETER™ RBM-9020 from The Dow Chemical Company. |
| Peroxide ("P2") | 2,5-dimethyl-2,5-di(t-butylperoxy)hexane, 50 wt % on silica. | Available under the name VAROX™ DBPH-50-EZD from Vanderbilt Chemicals. |
| Alumina trihydrate | 10 micrometer average particle size. | Available under the name HALTEX™ 310 from TOR Minerals International. |
| Amorphous alumina silicate | Powder | Available from Imerys under the name HARBORLITE™ 200. |
| Two-Part Silicone Adhesive | A room temperature or heat curable two-part silicone foam adhesive. | Available under the name DOWSIL™ 3-8235 Foam Part A and B from The Dow Chemical Company. |

*Determine viscosity of the silicone fluid by Brookfield LV viscometer with cone + plate spindle #CP-52.

**Determine number average molecular weight by gel permeation chromatography using a Waters 515 pump, a Waters 717 autosampler,, and a Waters 2410 differential refractometer. Conduct the separation with two 300 millimeters by 7.5 millimeters Polymer Laboratories PLgel 5-micrometer Mixed-C columns (molecular eight separation range of 200 to 2,000,000), preceded by a PLgel 5-micrometer guard column (50 millimeters by 7.5 millimeters). Perform the analysis using HPLC grade toluene flowing at 1.0 milliliters per minute as the eluent and with the columns and detector at 45° C. Prepare samples in toluene at approximately 0.4% w/v solids, and solvate for approximately 16 hours with occasional shaking followed by filtering through a 0.45 micrometer polytetrafluoroethylene syringe filter prior to analysis. Use and injection volume of 75 microliters and collect data for 25 minutes. For data collection and analysis use ThermoLabsystems Atlas chromatography software and Polymer Laboratories Cirrus GPC software. Determine molecular weight averages relative to a calibration curve ($3^{rd}$ order) created using polystyrene standards covering the molecular weight range of 580 to 1,300,000. Molecular weights are reported herein in units of g/mol. Refractive indices are measured at 45° C. at the sodium D-line (589 nm).

XIAMETER is a trademark of Dow Corning Corporation. DOWSIL is a trademark of the Dow Chemical Company. VAROX is a trademark of Vanderbilt Chemicals, LLC. HALTEX is a trademark of TOR Minerals International, Inc. ZEROGEN is a trademark of J.M.Huber Corporation. ADIN is a trademark of Tolsa. Wollastocoat and Wollstonite are a trademarks of NYCO Minerals, Inc. MIN-U-SIL is a trademark of U.S. Silica Company. CAB-O-SIL is a trademark of Cabot Corporation. HARBORLITE is a trademark of Imerys Perlite USA. MAGOX is a trademark of Premier Magnesiu, LLC.

Preparation of Polysiloxane Base Formulations

Base 1. Combine 31-38 wt % G1, 31-38 wt % G2 and 23-29 wt % Silica 2. Prepare according to standard mixing procedure as described in ASTM D3182.

Base 2. Combine 52-64 wt % G1, 0.9-2.0 wt % F2 and 34-42 wt % Silica 2. Prepare according to standard mixing procedure as described in ASTM D3182.

Base 3. Combine 33-41 wt % G1, 32-42 wt % G2 and 0.3-0.8 wt % F2, 20-29 wt % Silica 2, 0.2-0.8 wt % magnesium oxide. Prepare according to standard mixing procedure as described in ASTM D3182.

Base 4. Combine 61-71 wt % G1, 26-36 wt % silica 2. Prepare according to standard mixing procedure as described in ASTM D3182.

Preparation of Additives

A1. A masterbatch of 50 wt % cerium hydroxide in Gum 3. Prepare according to standard mixing procedure as described in ASTM D3182.

A2. Proprietary pigmentable flame retardant additive that includes benzotriazole dispersed in silicone. Available as XIAMETER™ RBM-9006 from The Dow Chemical Company.

A3. Masterbatch of 38-56 wt % C.I. Pigment Black 26, 13-19 wt % silicone dioxide in Base 4. Prepare according to standard mixing procedure as described in ASTM D3182.

A4. A masterbatch of 2-10 wt % magnesium ferrite, 10-40 wt ˆ ultramarine blue pigment, 10-40 wt % titanium dioxide in Gum 1. Prepare according to standard mixing procedure as described in ASTM D3182.

A5. A masterbatch of 45-55 wt % magnesium oxide in Gum 1. Prepare according to standard mixing procedure as described in ASTM D3182.

A6. Platinum-divinyltetramethyldisiloxane complex (0.5 wt % platinum available as Karstedt Catalyst form Sigma Aldrich.

A7. A masterbatch of 62-69 wt % iron oxide in Gum 1. Prepare according to standard mixing procedure as described in ASTM D3182.

A8. A masterbatch of 23-28 wt % Yellow Pigment in Gum 1. Prepare according to standard mixing procedure as described in ASTM D3182.

Preparation of Compounds

Compound 1. Combine 100 weight-parts ("parts") B1, 78.6 parts G1, 195.9 parts alumina trihydrate, 117.5 parts magnesium hydroxide, 4.7 parts magnesium silicate, 47 parts calcium metasilicate, 15.6 parts A2, 1.4 parts F4, 16.4 parts A4, 0.4 parts A8 and 6.2 parts P2. Prepare according to standard mixing procedure as described in ASTM D3182.

Compound 2. 100 parts B3, 90 parts calcium metasilicate, 0.2 parts A6, and 0.9 parts P2. Prepare according to standard mixing procedure as described in ASTM D3182.

Compound 3. 100 parts B3, 90 parts calcium metasilicate, 1.7 parts A6, 09 parts P2. Prepare according to standard mixing procedure as described in ASTM D3182.

Compound 4. 100 parts B3, 90 parts calcium metasilicate, 1.7 parts A6, 0.9 parts P2, 1.5 parts A1. Prepare according to standard mixing procedure as described in ASTM D3182.

Compound 5. 28.6 parts B1, 71.4 parts B2, 0.8 parts F5, 1.3 parts A7, 4.2 parts A3, 28.6 parts amorphous alumina silicate, 0.6 parts magnesium hydroxide, 1.3 parts P1. Prepare according to standard mixing procedure as described in ASTM D3182.

Sample Preparation and Characterization

Prepare three different types of Samples: Reference Samples, Comparative Samples and Illustrative Samples as described below. Characterize each of the samples for flame resistance and thermal insulating properties using the following method.

Sample Characterization—Thermal Insulating Property and Flame Resistance

Thermal Insulating Property. Place a hot plate in a hydraulic press enclosed in a space vented from one side of the hot plate with a venting port directly adjacent to the sample. Heat the hot-plate to 710° C. with a porous ceramic refractory insulator on the top surface of the hot-plate. Adhere four thermocouple probes onto an aluminum heat sink using Kapton tape. Place a Sample onto the aluminum heat sink and affix it to the aluminum heat sink using Kapton tape. Affix another thermocouple onto the sample surface using Kapton tape. Remove the insulator from the hot surface of the hot plate and rapidly place the Sample onto the hot surface of the hot plate with the aluminum heat sink on the opposite side of the sample from the hot plate. Quickly apply 255 kiloPascal pressure to compress the sample against the hot plate. Monitor the temperature of the hot plate surface and the sample using a data logger. When the temperature of the Sample side opposite the hot plate reaches 180° C. pressure is released and the test ended. The time required for the Sample side opposite the hot plate to reach 120° C. is noted as the Thermal Insulation Time in terms of seconds. Divide the Thermal Insulation Time by the thickness of the Sample to provide a Thermal Insulating Value in terms of seconds per millimeter (s/mm). Higher Thermal Insulating Times and Values corresponded to greater thermally insulating properties of the Sample.

For Flame Resistance, Observe the Sample during the Thermal Insulating Property test to see if the Sample ignites. If flames are observed, note whether they are self-extinguishing within the testing time (time requires to reach 180° C.). If the sample ignites and is not self-extinguishing during the testing time, the flame is allowed to continue observing beyond the testing time. General observations reveal that samples that ignite will generally do so within the first five seconds after coming into contact with the hot plate. If a Sample ignites during the testing time, it fails the Flame Resistance test.

Reference Samples

The Reference Samples are individual aerogel layers and individual polysiloxane layers. Characterize the reference samples to identify how each of the individual layers of Illustrative Samples perform apart from other layers in the Illustrative Samples.

Reference Sample 1 (R1) is Aerogel 1 (4 mm thick). R1 has a Thermal Insulating Time of 28 s, a Thermal Insulating Value of 7.0 s/mm and passes the Flame Resistance test with no flame.

Reference Sample 2 (R2) is Aerogel 1 (2 mm thick). R2 has a Thermal Insulating Time of 134 s, a Thermal Insulating Value of 67.0 s/mm and passes the Flame Resistance test with no flame.

Reference Samples 3-13 (R3-R13) are polysiloxane layers. Prepare the polysiloxane layers by compounding the components of the sample together according to the standard mixing procedure of ASTM D3182, calendaring them to form sheet having a thickness of 3 mm using a two-roll mill according to ASTM D3182. Cure sheets of R1 and R7-R13 at 120° C. for 15 minutes in a hot press under 30 tons of pressure on a metal chase of 3 mm thickness. Cure sheets of R4-R7 at 170° C. for 20 minutes prior to characterizing in a hot press under 30 tons of pressure on a metal chase of 3 mm thickness.

Table 2 provides compositions and test results for R3-R13. Compositions list the components in terms of grams of component in the formulation. Table 2 also provides test results for R3-R13.

the parts of the Two Part Silicone Adhesive using a static mixer and apply a thin layer onto both opposing primary surfaces of a sheet of Aerogel 2 and then place a sheet of the cured polysiloxane layer against the layer of adhesive to form a sandwiched structure of polysiloxane layer-adhesive layer-aerogel layer-adhesive layer-polysiloxane layer. Place the sandwiched structure into a metal frame having a depth of 4 mm Place apply a force of 10 tons against the laminated structure to press the layers together at 25° C. for 30 minutes. The resulting laminated structure is CS1 and has a thickness of 3.5 mm CS1 has a Thermal Insulating Time of 114 s, a Thermal Insulating Value of 32.6 s/mm and Fails the Flame Resistance Test.

Comparative Sample 2 (CS2)—Flame Retardant Additive Free Polysiloxane Layers. Prepare S2 by laminating a 0.6

TABLE 2

| Component | R3 | R4 | R5 | R6 | R7 | R8 | R9 | R10 | R11 | R12 | R13 |
|---|---|---|---|---|---|---|---|---|---|---|---|
| B1 | 17.13 | | | | 20.9 | 17.13 | 17.13 | 17.13 | 17.13 | 17.13 | 17.13 |
| B2 | | | | | 52.26 | | | | | | |
| B3 | | 52.33 | 51.91 | 51.51 | | | | | | | |
| G1 | 13.46 | | | | | 14.32 | 13.46 | 13.46 | 13.46 | 13.46 | 13.46 |
| Alumina Trihydrate | 33.55 | | | | | | | 37.93 | 5 | 10 | 20 |
| Magnesium Hydroxide | 20.13 | | | | | | | 24.43 | | | |
| Magnesium silicate | 0.8 | | | | | | | | 0.8 | 0.8 | 0.8 |
| Calcium Metasilicate 1 | 8.05 | | | | | | | | | | |
| Calcium Metasilicate 2 | | 47.1 | 46.72 | 46.36 | | | | | 56.66 | 51.66 | 41.66 |
| A2 | 2.68 | | | | | | 2.68 | 2.68 | 2.68 | 2.68 | 2.68 |
| A6 | | 0.1 | 0.9 | 0.9 | | | | | | | |
| P1 | 1.07 | | | | 0.97 | 1.07 | 1.07 | 1.07 | 1.07 | 1.07 | 1.07 |
| P2 | | 0.47 | 0.47 | 0.46 | | | | | | | |
| F4 | 0.24 | | | | | | | | | | |
| F5 | | | | | 0.56 | | | | | | |
| A4 | 2.81 | | | | | | | | | | |
| A8 | 0.07 | | | | | | | | | | |
| A7 | | | | | 0.97 | | | | | | |
| A3 | | | | | 3.07 | | | | | | |
| A1 | | | | 0.77 | | | | | | | |
| Amorphous alumina silicate | | | | | 20.9 | | | | | | |
| Magnesium oxide | | | | | 0.42 | | | | | | |
| Silica 1 | | | | | | 64.1 | 62.37 | | | | |
| Test Results | | | | | | | | | | | |
| Thermal Insulating Time (s) | 20 | 49 | 58 | 58 | 48 | 25 | 20 | | | | |
| Thermal Insulating Value (s/mm) | 6.7 | 16.3 | 19.3 | 19.3 | 16.0 | 8.3 | 6.7 | | | | |
| Flame Resistance | Pass | Fail | Fail | Fail | Fail | Fail | Fail | Pass | Pass | Pass | Pass |

Comparative Samples

The Comparative Samples are three-layer laminates with a polysiloxane layer on either side of an aerogel layer. The two polysiloxane layers are identical to one another and are each 0.6 mm thick.

Comparative Sample 1 (CS1)—Additive Free Polysiloxane Layers. Prepare S1 by forming two polysiloxane layers that contain no additives. For each polysiloxane layer compound together 98.9 g B3 and 1.07 g P1 and then calendar the compounded material into sheets having a thickness of 0.6 mm Cure the sheets of polysiloxane layer at 170° C. for 20 minutes in a hot press under 30 tons of pressure on a metal chase of 3 mm thickness. Mix together mm thick polysiloxane sheet having the composition of R8 to opposing primary surfaces of Aerogel 2, without use of an adhesive. Prepare two polysiloxane layers by compounding together the formulation of R8 and calendaring to a thickness of 0.6 mm each. Prior to curing, place a polysiloxane layer on either side of a 2 mm thick sheet of Aerogel 2 to form a sandwiched structure. Place the sandwiched structure into a metal frame having a depth of 4 mm Apply a force of 10 tons against the laminated structure while in a 3 mm thick chase to press the layers together at 120° C. for 20 minutes. Cure the pressed laminated structure at 170° C. for 20 minutes to obtain CS2, which has a thickness of 3.5 mm CS2 has a Thermal Insulating Time of 156 seconds (s), a Thermal Insulating Value of 44.6 seconds per millimeter (s/mm) and Fails the Flame Resistance Test.

Comparative Sample 3 (CS3)—Flame Retardant Additive Free Polysiloxane Layers. Prepare S3 by in like manner as CS2 except us the formulation of R9 for the polysiloxane layers. CS3 Fails the Flame Resistance Test and burst into flame before Thermal Insulating Time or Value could be determined.

The Comparative Samples reveal that laminate structures with polysiloxane layers that do not have the flame retardant additive of the present invention Fail the Flame Resistance Test and further result.

Illustrative Samples

The Illustrative Samples demonstrate laminates articles that pass the Flame Resistance Test and show unexpectedly high Thermal Insulating Properties (that is, greater Thermal Insulating values than the additive values of the layers). The composition and evaluation results of the Illustrative Samples is in Table 3 (component values are in grams) and the Illustrative Samples are described below Table 3.

Illustrative Sample 1 (IS1): Aerogel 1+Polysiloxane Layers of R3 with adhesive. Prepare IS1 in like manner as CS1 except use Aerogel 1 instead of Aerogel 2 and use the formulation of R3 for the polysiloxane layers. The resulting laminate article has a thickness of 5.5 mm with a 4 mm aerogel layer and two polysiloxane layers that are each 0.6 mm thick.

Illustrative Sample 2 (IS2): Aerogel 1+Polysiloxane Layer of R3 without adhesive. Prepare IS2 in like manner as CS2 except use Aerogel 1 instead of Aerogel 2 and use the formulation of R3 for the polysiloxane layers. The resulting laminate article has a thickness of 4.5 mm with a 4 mm aerogel layer and two polysiloxane layer that are each 0.6 mm thick.

Illustrative Sample 3 (IS3): Aerogel 2+Polysiloxane Layers of R3 with adhesive. Prepare IS3 in like manner as IS1 except use Aerogel 2 instead of Aerogel 1. The resulting laminate article has a thickness of 4 mm with a 2 mm aerogel layer and two polysiloxane layers that are each 0.6 mm thick.

Illustrative Sample 4 (IS4): Aerogel 2+Polysiloxane Layer of modified R3 without adhesive. Prepare IS4 in like manner as IS2 except use Aerogel 2 instead of Aerogel 1 and use a modified R3 formulation for the polysiloxane layers. The resulting laminate article has a thickness of 3.5 mm with a 2 mm aerogel layer and two polysiloxane layer that are each 0.6 mm thick.

Illustrative Sample 5 (IS5): Aerogel 2+Polysiloxane Layer of modified R3 without adhesive. Prepare IS5 in like manner as IS2 except use Aerogel 2 instead of Aerogel 1 and use a modified R3 formulation for the polysiloxane layers. The resulting laminate article has a thickness of 3.5 mm with a 2 mm aerogel layer and two polysiloxane layer that are each 0.6 mm thick.

Illustrative Sample 6 (IS6): Aerogel 2+Polysiloxane Layer of modified R3 without adhesive. Prepare IS6 in like manner as IS2 except use Aerogel 2 instead of Aerogel 1 and use a modified R3 formulation for the polysiloxane layers. The resulting laminate article has a thickness of 3.5 mm with a 2 mm aerogel layer and two polysiloxane layer that are each 0.6 mm thick.

Illustrative Sample 7 (IS7): Aerogel 2+Polysiloxane Layer of modified R3 without adhesive. Prepare IS7 in like manner as IS2 except use Aerogel 2 instead of Aerogel 1 and use a modified R3 formulation for the polysiloxane layers. The resulting laminate article has a thickness of 3.5 mm with a 2 mm aerogel layer and two polysiloxane layer that are each 0.6 mm thick.

Illustrative Sample 8 (IS8): Aerogel 2+Polysiloxane Layer of modified R3 without adhesive. Prepare IS8 in like manner as IS2 except use Aerogel 2 instead of Aerogel 1 and use a modified R3 formulation for the polysiloxane layers. The resulting laminate article has a thickness of 3.5 mm with a 2 mm aerogel layer and two polysiloxane layer that are each 0.6 mm thick.

Table 3 shows a comparison of Thermal Insulation Time for the Illustrative Samples to what is an Expected Thermal Insulation Time for the laminate based on additive values of the individual layers. The Expected Thermal Insulation Time is a sum of the Thermal Insulation Time for each of the layer of the Sample. For instance, the Expected Thermal Insulation Time for IS1 is calculated as follows:

Layer 1=Polysiloxane layer R3 at 0.6 mm thickness so expected Thermal Insulation Time is (0.6 mm)(6.7 s/mm)=4.02 s Layer 2=Aerogel 2 (R1) so the expected Thermal Insulation Time is 28 s Layer 3=Layer 1 so the expected Thermal Insulation Time is 4.02 s The overall Expected Thermal Insulation Time for IS1= (4.0 s)+(28 s)+(4.0 s)=36 s Surprisingly, the Illustrative Samples all demonstrate a Thermal Insulation Value that exceeds the Expected Thermal Insulation Value, suggestive of some synergistic performance resulting from the lamination of the layers together to form a laminated article when in scope of the present invention.

TABLE 3

| Component | IS1 | IS2 | IS3 | IS4 | IS5 | IS6 | IS7 | IS8 |
|---|---|---|---|---|---|---|---|---|
| Aerogel | 1 | 1 | 2 | 2 | 2 | 2 | 2 | 2 |
| B1 | 17.13 | 17.13 | 17.13 | 17.13 | 17.13 | 17.13 | 17.13 | 17.13 |
| G1 | 13.46 | 13.46 | 13.46 | 13.46 | 13.46 | 13.46 | 14.32 | 13.46 |
| Alumina Trihydrate | 33.55 | 33.55 | 33.55 | 33.55 | | 33.93 | 34.34 | 53.53 |
| Magnesium Hydroxide | 20.13 | 20.13 | 20.13 | | 53.53 | 20.38 | 20.73 | |
| Magnesium silicate | 0.8 | 0.8 | 0.8 | 0.8 | 0.8 | | 0.8 | 0.8 |
| Calcium Metasilicate 1 | 8.05 | 8.05 | 8.05 | | | | | |
| Calcium Metasilicate 2 | | | | 28.11 | 8.05 | 8.05 | 8.05 | 8.05 |
| A2 | 2.68 | 2.68 | 2.68 | 2.68 | 2.68 | 2.68 | | 2.68 |
| P1 | 1.07 | 1.07 | 1.07 | 1.07 | 1.07 | 1.07 | 1.07 | 1.07 |
| F4 | 0.24 | 0.24 | 0.24 | | | | | |
| A4 | 2.81 | 2.81 | 2.81 | | | | | |
| A8 | 0.07 | 0.07 | 0.07 | | | | | |

TABLE 3-continued

| Component | IS1 | IS2 | IS3 | IS4 | IS5 | IS6 | IS7 | IS8 |
|---|---|---|---|---|---|---|---|---|
| Test Results | | | | | | | | |
| Expected Thermal Insulation Time (s) | 36 | 36 | 142 | 142 | 142 | 142 | 142 | 142 |
| Thermal Insulation Time (s) | 106 | 123 | 143 | 162 | 167 | 146 | 177 | 153 |
| Thermal Insulating Value (s/mm) | 19.3 | 27.3 | 35.8 | 46.3 | 47.7 | 41.7 | 50.6 | 43.7 |
| Flame Resistance | PASS | PASS | PASS | PASS | PASS | PASS | PASS | PASS |

Exploration of FR Additive Lower Limit

Prepare additional laminates using Aerogel 2 and Polysiloxane Layers R10-R13 to explore the lower limit of flame retardant needed to pass the Flame Resistance test. The resulting laminates are CS4 (using R11 as the polysiloxane layer) and IS9-IS11 (using R10, R12 and R13 as the polysiloxane layer.

Prepare the samples in like manner as IS4 except use the polysiloxane layer identified in Table 4 for the two polysiloxane layers.

Table 4 contains a Characterization of CS4 and IS9-IS11.

TABLE 4

| Component | CS4 | IS9 | IS10 | IS11 |
|---|---|---|---|---|
| Aerogel | 2 | 2 | 2 | 2 |
| Polysiloxane Layer | R11 | R10 | R12 | R13 |
| B1 | 17.13 | 17.13 | 17.13 | 17.13 |
| G1 | 13.46 | 13.46 | 13.46 | 13.46 |
| Alumina Trihydrate | 5 | 37.93 | 10 | 20 |
| Magnesium Hydroxide | | 24.43 | | |
| Magnesium silicate | 0.8 | | 0.8 | 0.8 |
| Calcium Metasilicate 2 | 56.66 | | 51.66 | 41.66 |
| A2 | 2.68 | 2.68 | 2.68 | 2.68 |
| P1 | 1.07 | 1.07 | 1.07 | 1.07 |
| Test Results | | | | |
| Flame Resistance | FAIL | PASS | PASS | PASS |

The results for CS4 in Table 4 indicate that when the polysiloxane layer contains 5 wt % of FR Additive (aluminum trihydrate) then the laminate fails the Flame Resistance test—even though the polysiloxane layer itself (R11) passes the Flame Resistance test. As long as the concentration of FR additive is greater than 5 wt %, then the laminate passes the Flame Resistance test.

Thermal Insulating performance for IS9-IS11 is expected to follow the surprising result trend demonstrated for IS1-IS8 indicative of synergistic thermal insulation performance from the lamination of the layers together to form a laminated article.

What is claimed is:

1. A process comprising preparing a laminate material comprising an aerogel layer and a polysiloxane layer distinct from the aerogel layer and in contact with the aerogel layer either directly or through an adhesive that is in direct contact with both the aerogel layer and the polysiloxane layer; where the polysiloxane layer comprises a polysiloxane and greater than 5 weight-percent and 95 weight-percent or less based on polysiloxane layer weight of fire retarding additives selected from a group consisting of metal hydroxides, mixed metal hydroxides, hydrated metal salts, and any combinations thereof dispersed throughout the polysiloxane layer; the process comprising the following steps:

(a) paring a polysiloxane layer by compounding the fire retarding additives with an uncured polysiloxane elastomer precursor to form a compounded material and then preparing sheets of the compounded material;
(b) providing aero gel layer; and
(c) laminating the polysiloxane layer to the aerogel layer by one of the following two methods:

Method 1:
(i) positioning the polysiloxane layer with one surface against a surface of the aerogel layer;
(ii) applying pressure to press the aerogel and polysiloxane layers again tone another; and
(iii) heating to trigger curing of the polysiloxane of the polysiloxane layer while in contact with the aerogel layers;

Method 2:
(i) heating the polysiloxane layer to produce a cured sheet of compounded polysiloxane elastomer as the polysiloxane layer;
(ii) disposing an adhesive onto the surface of one or both of the aerogel and polysiloxane layers;
(iii) pressing the aerogel and polysiloxane layer together with the adhesive between the aerogel and polysiloxane surfaces.

2. The process of claim 1 where heating refers to heating to a temperature of 150 degrees Celsius or higher 10 minutes or more.

3. The process of claim 1, wherein preparing the polysiloxane layer includes preparing sheets of compounded material having a thickness of 0.2 millimeters or more.

4. The process of claim 1, wherein preparing the polysiloxane layer includes preparing sheets of compounded material having a thickness of 0.5 to 1.0 millimeters.

5. The process of claim 1, wherein the fire retarding additive is any one or any combination of more than one additive in a group consisting of aluminum trihydrate and magnesium hydroxide, calcium hydroxide, magnesium carbonate hydroxide, aluminum carbonate hydroxide, boehmite, hydrated magnesium sulfate, magnesium carbonate trihydrate, and magnesium carbonate hydroxide tetrahydrate.

6. The process of claim 1, wherein preparing the polysiloxane layer includes compounding into the uncured polysiloxane elastomer precursor additional additives besides the metal hydroxide, mixed metal hydroxide and hydrated metal salts fire retarding additives provided that the total amount of additional additives and metal hydroxide, mixed metal hydroxide and hydrated metal salts fire retarding additives add up to 95 weight-percent or less of the polysiloxane layer weight.

7. The process of claim 1, wherein the aerogel of the aerogel layer is selected from a group consisting of silica aerogel, metal oxide aerogel, mixed metal oxide aerogel, organic or carbon aerogel, semiconducting metal aerogel, chalcogenide aerogel, metal aerogel, silane and siloxane modified aerogels, and reinforced forms of any of these aerogels.

8. The process of claim 1, wherein the laminate material has a thickness of less than 10 millimeters.

9. The process of claim 1, wherein the process further comprises applying a second polysiloxane layer to an opposing surface of an aerogel by Method 1 or Method 2 to produce a laminate material that comprises a second polysiloxane layer positioned so that the two polysiloxane layers are on opposing sides of the aerogel, where the second polysiloxane layer is in contact with the aerogel layer either directly or through an adhesive that is in direct contact with both the aerogel layer and the second polysiloxane layer and where the polysiloxane comprises greater than 5 weight-percent and 95 weight-percent or less based on polysiloxane weight of fire retarding additives selected from metal and mixed metal hydroxides dispersed in a polysiloxane matrix.

10. The process of claim 1, wherein the process further includes positioning the laminate between battery cells of a battery pack.

* * * * *